No. 819,421. PATENTED MAY 1, 1906.
B. A. GRAMM.
CLUTCH MECHANISM.
APPLICATION FILED NOV. 29, 1905.

WITNESSES:
James F. Duhamel
M. Hamilton

INVENTOR
Benjamin A. Gramm
BY
James Hamilton
ATTORNEY

UNITED STATES PATENT OFFICE.

BENJAMIN A. GRAMM, OF CHILLICOTHE, OHIO.

CLUTCH MECHANISM.

No. 819,421.    Specification of Letters Patent.    Patented May 1, 1906.

Application filed November 29, 1905. Serial No. 289,587.

*To all whom it may concern:*

Be it known that I, BENJAMIN A. GRAMM, a citizen of the United States, residing in Chillicothe, in the county of Ross and State of Ohio, have invented certain new and useful Improvements in Clutch Mechanisms, of which the following is a specification, reference being had to the accompanying drawings.

My invention relates to improvements in clutch mechanisms; and the object of my invention is to provide a clutch mechanism of the sliding-cone type which shall be particularly adapted for use in automobiles and which shall possess great power in proportion to its size.

Another object of my invention is to provide a clutch which shall be readily adjustable to take up wear and which shall be susceptible of fine adjustment.

A third object of my invention is to provide a clutch by means of which an automobile may be started very gradually in starting up steep grades.

Briefly described, my new clutch mechanism is of the contracting-band type operated by a slidable cone. On the fly-wheel of the motor is cast a flange, around the face of which is placed a steel band lined with "Gandy" belting, (or other suitable lining.) The ends of the steel bands on one side of the flange are attached to two levers or fingers pivoted near their middle, while at the other side of the flange the ends of the steel bands are connected by means of a turnbuckle provided with locking-nuts to secure the turnbuckle in any desired adjusted position. The inner ends of the fingers are forced together by a helical spring and carry rollers between which the cone is forced, thereby forcing the inner ends of the fingers outwardly and the outer ends inwardly to contract the band and throw the clutch into operative position.

Figure 1:
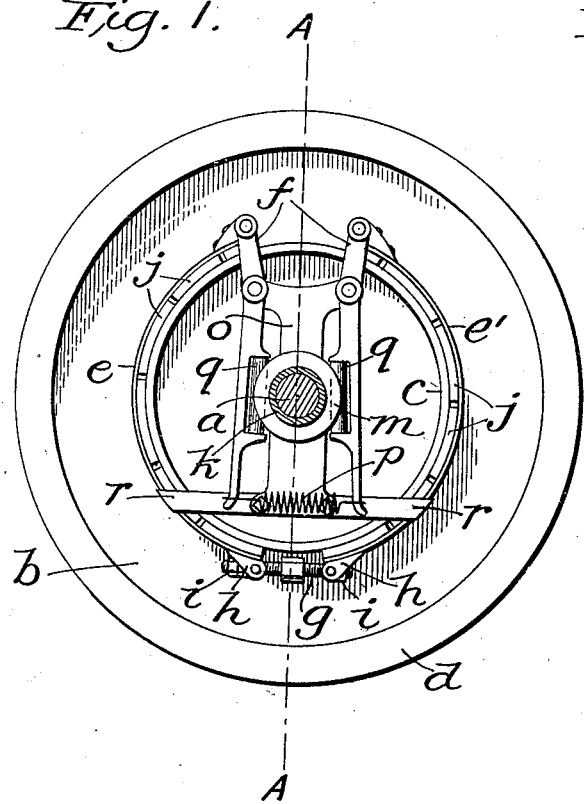
Figure 2:
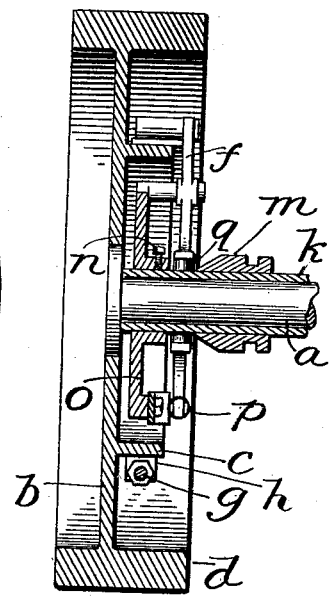

In the drawings illustrating the principle of my invention and the best mode now known to me of applying that principle, Figure 1 is a side elevation of my new clutch mechanism, and Fig. 2 is a sectional view on line A A of Fig. 1.

Upon the motor-shaft $a$ is mounted a flywheel $b$ formed with an inner flange $c$ and an outer flange $d$. Around the flange $c$ extends a two-part steel band, one end of each of the parts $e\ e'$ of which is suitably secured to the outer end of one of a pair of fingers $f$, the other end of each of said parts $e\ e'$ being secured to a turnbuckle $g$ by an ear $h$, threaded to engage therewith. Upon the ends of the turnbuckle $g$ are lock-nuts $i$, adapted to secure the turnbuckle in any desired adjusted position. The steel band is lined with Gandy belting $j$, preferably, which bears upon the outside of the flange $c$.

Around the motor-shaft $a$ is a sleeve $k$, which drives the transmission-gear of the automobile, and upon the sleeve $k$ is slidably mounted a cone $m$, grooved to receive a suitable operating device. (Not shown.) Secured to the sleeve $k$ by a set-screw $n$ is an arm or bracket $o$, in the upper end of which are pivotally mounted the pair of fingers $f$. As previously described, the upper ends of these fingers $f$ are secured to the ends of the steel band $e\ e'$, while the lower ends are forced together by a helical spring $p$ and are provided with rollers $q$, between which the cone $m$ is designed to be moved. Secured to the bracket $o$ is a cross-piece $r$, which serves to hold the steel band in place upon the flange.

The operation of my new clutch mechanism will now be readily understood by all skilled in this art. When the cone $m$ is forced by suitable mechanism (not shown) in between the rollers $q$ to start the automobile, the lower ends of the fingers $f$ are forced apart against the tension of the spring $p$, and the upper ends of said fingers are forced toward each other, thereby tightening the steel band $e\ e'$ around the flange $c$ and starting the bracket $o$, and therethrough the sleeve $k$, rotating. The sleeve $k$ being connected with the transmission-gear (not shown) of the automobile, the latter is started. When the lining of the band becomes worn, the wear is taken up by rotating the turnbuckle in the proper direction to draw the ends of the parts $e\ e'$ of the steel band together, and the adjustment having been made the turnbuckle is secured in position by means of the lock-nuts $i$.

My new clutch mechanism has great contracting power in proportion to its size and is capable of starting an automobile very gradually, as the cone can be gradually forced in between the rollers upon the fingers which control the steel band. This gradual starting of the car is of great importance, especially in starting up a steep grade, for which my new clutch is particularly well adapted.

What I claim is—

In a clutch mechanism, the combination of a driving-shaft; a wheel mounted thereon and formed with a flange; a two-part band adapted to be tightened around said flange, one pair of the opposed ends of said band being connected by a turnbuckle and the other pair of the opposed ends of said band being positively secured to the ends of levers; a pair of levers one end of each of which is positively secured to one end of each part of said band, the other end of each of said levers being connected by a spring, said levers being each provided with a roller on opposite sides of said shaft; said spring; said turnbuckle; a bracket upon which said levers are fulcrumed; a sleeve mounted loosely upon said shaft and secured to said bracket; and a cone slidable along said sleeve and adapted to enter between said rollers to swing said levers and tighten said band.

BENJAMIN A. GRAMM.

Witnesses:
LUTHER J. HATHAWAY,
HARRY T. HERMANN.